United States Patent [19]
Denkowski et al.

[11] 3,726,155
[45] Apr. 10, 1973

[54] DE-CLUTCH MECHANISM IN VALVE OPERATOR

[75] Inventors: Walter J. Denkowski; John Zouzoulas, both of King of Prussia, Pa.

[73] Assignee: Philadelphia Gear Corporation, King of Prussia, Pa.

[22] Filed: Nov. 17, 1971

[21] Appl. No.: 199,427

[52] U.S. Cl. .................................74/625, 251/130
[51] Int. Cl. ...............................................F16h 25/00
[58] Field of Search..............................74/625, 626; 251/130

[56] References Cited

UNITED STATES PATENTS

| | | | |
|---|---|---|---|
| 2,989,878 | 6/1961 | Denkowski et al. | 74/625 |
| 2,634,623 | 4/1953 | Kron | 74/625 |
| 2,703,991 | 3/1955 | Kron et al. | 74/625 |
| 2,724,288 | 11/1955 | Benson | 251/130 |

FOREIGN PATENTS OR APPLICATIONS

| | | | |
|---|---|---|---|
| 706,285 | 3/1954 | Great Britain | 251/130 |

*Primary Examiner*—Charles J. Myhre
*Assistant Examiner*—Wesley S. Ratliff, Jr.
*Attorney*—Henry N. Paul, Jr. et al.

[57] ABSTRACT

In a de-clutch mechanism for shifting automatically between a primary drive and a secondary drive and in which the secondary drive actuates a cam and flipper mechanism to shift a clutch fork to shift a spring-loaded slidable sleeve clutch from primary drive to secondary drive, a secondary clutch mechanism is provided between the flipper mechanism and the clutch fork for assuring that the clutch fork can be returned from secondary drive to primary drive even though the flipper mechanism happens to be in such position relative to the flipper cam that the cam tends to block return movement of the flipper mechanism. As an additional feature, an anti-clicking arrangement is provided to prevent the flipper mechanism from being repeatedly struck by the flipper cam during secondary drive operation.

10 Claims, 9 Drawing Figures

INVENTORS.
Walter J. Denkowski
BY   John Zouzoulas

Paul + Paul
ATTORNEYS.

INVENTORS.
Walter J. Denkowski
John Zouzoulas

BY Paul + Paul
ATTORNEYS.

DE-CLUTCH MECHANISM IN VALVE OPERATOR

BACKGROUND OF THE INVENTION

The present invention relates to a de-clutch mechanism for coupling a rotatable load shaft selectively to either a primary drive or a secondary drive. The primary drive is usually a power drive while the secondary drive is ordinarily a manual handwheel drive.

The de-clutch mechanism includes a sleeve clutch splined to the load shaft and slidable therealong. The sleeve clutch is normally spring-biased to a position to couple the power drive to the load shaft. In the event of power failure, a manual drive is connected automatically to the load shaft by merely turning a handwheel. Turning the handwheel is effective, by means of a cam and flipper mechanism, to shift the sleeve clutch axially along the splined load shaft into coupling engagement with the manual drive gear. Return to motor drive is effected automatically when the power is turned on. De-clutch mechanisms of the types referred to are shown in U. S. Pat. Nos. 2,592,374 and 3,168,841.

While the de-clutch mechanisms of the type being described have other uses, the mechanisms are particularly suited for use in valve operators which, as is well known, are actuating mechanisms employed to open and close large valves. Such valve actuating mechanisms usually include a nut which is fixed axially in the housing and which when rotated moves a threaded spindle or stem in its axial direction, thereby to open and close a valve. The nut is usually in the form of a worm gear driven by a worm shaft. Rotation of the worm shaft is effected by two selectively operable gear trains one of which is power driven and the other of which is manually operated. When used in connection with such valve operators, the de-clutch mechanism is adapted, when the power is off and the handwheel is rotated, to shift the sleeve clutch in a direction to disconnect the power drive gear train from the worm shaft and to connect automatically the handwheel drive gear train to the worm shaft. This is accomplished by the mere action of manually turning the handwheel. When the power is turned on, the de-clutch mechanism automatically shifts the sleeve clutch in the opposite direction to disconnect the handwheel drive and to connect the motor drive gear train to the worm shaft.

In such prior art de-clutch mechanisms, when the power is off, if the handwheel happens to be manually rotated less than one full revolution to a particular position such that the flipper follower is opposite the flipper cam, the sleeve clutch will be de-coupled from power drive but not coupled to handwheel drive, and if the sleeve clutch happens to be in this neutral position when the power comes on, the prior art mechanism is not capable of shifting the sleeve clutch back into motor drive. While the likelihood of this happening is remote, the possibility does exist.

SUMMARY OF THE INVENTION

An important object of the present invention is to provide a de-clutch mechanism of the type referred to above in which it is not possible to turn the handwheel to such a position that, when the power comes on, the motor drive is incapable of pulling the sleeve clutch from neutral position into motor drive engagement.

The foregoing object is accomplished by providing a secondary clutch device to couple the flipper mechanism and the sleeve-clutch fork to permit the fork to shift the sleeve clutch back into motor drive engagement even though the flipper mechanism is prevented by the flipper cam from returning to its original position.

DETAILED DESCRIPTION OF THE PREFERRED EMBODIMENTS

Figure 1:
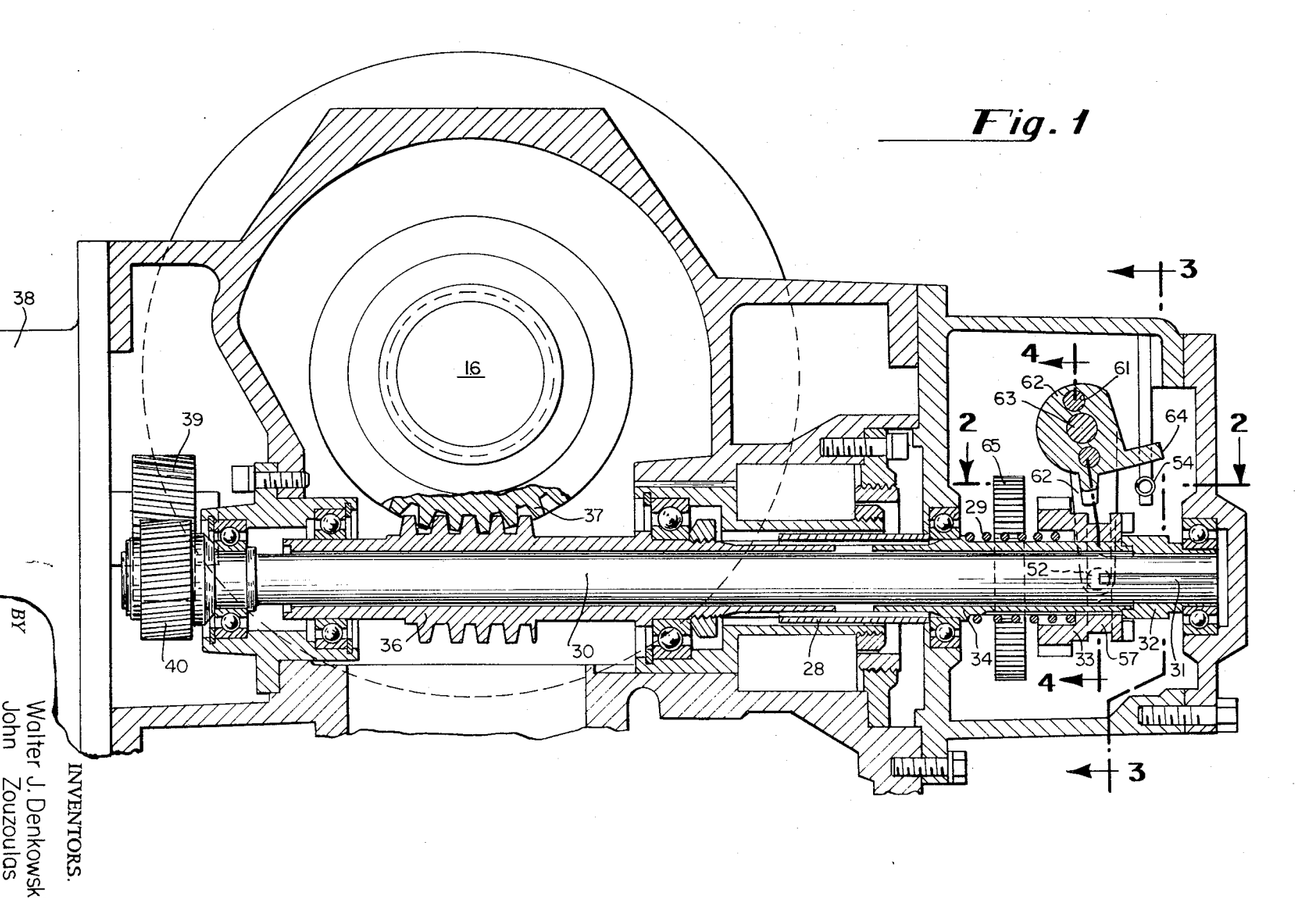
FIG. 1 is a plan view, in section, of a de-clutch mechanism embodying the present invention looking along the line 1—1 of FIG. 3.

Reference is first made to FIG. 1. A threaded stem 16 is driven by a worm gear or nut 37 which is fixed axially in the housing. Nut 37 is driven rotationally by a worm 36. Worm 36 is power driven by a motor 38 or, alternatively, is driven manually by a handwheel, not shown.

Figure 2:
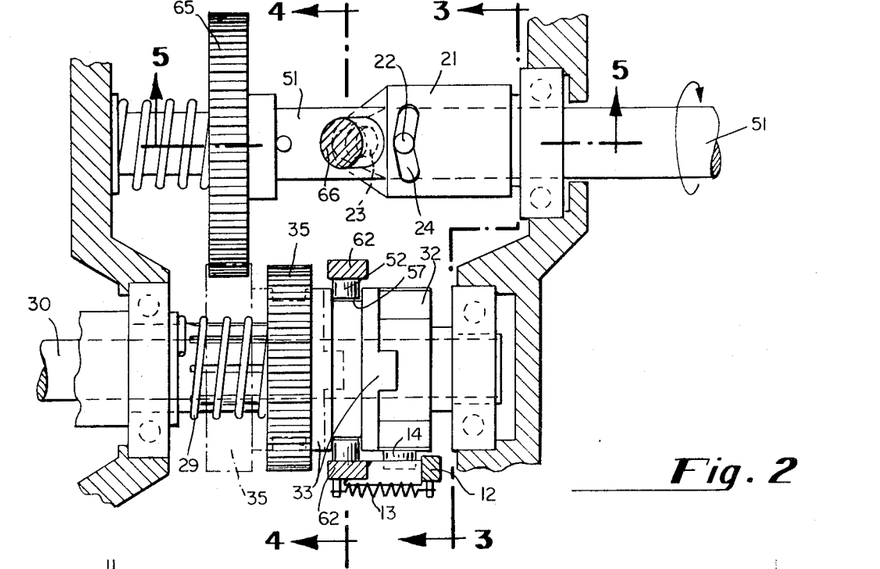
FIG. 2 is an elevational side view looking along the line 2—2 of FIG. 1.

The power drive may be traced from motor 38 through helical pinion 39, gear 40, shaft 30, clutch element 32 which is adapted by a lug-on-lug engagement to drive sliding clutch 33, sleeve 34 which is splined to clutch 33, collar 28 which is keyed to sleeve 34 and also keyed to worm 36. The handwheel drive may be traced from handwheel shaft 51 (FIG. 2), spur gear 65, spur gear 35 of sleeve clutch 33, sleeve 34, collar 28 and worm 36.

SHIFT FROM MOTOR DRIVE TO HANDWHEEL DRIVE

Figure 3:
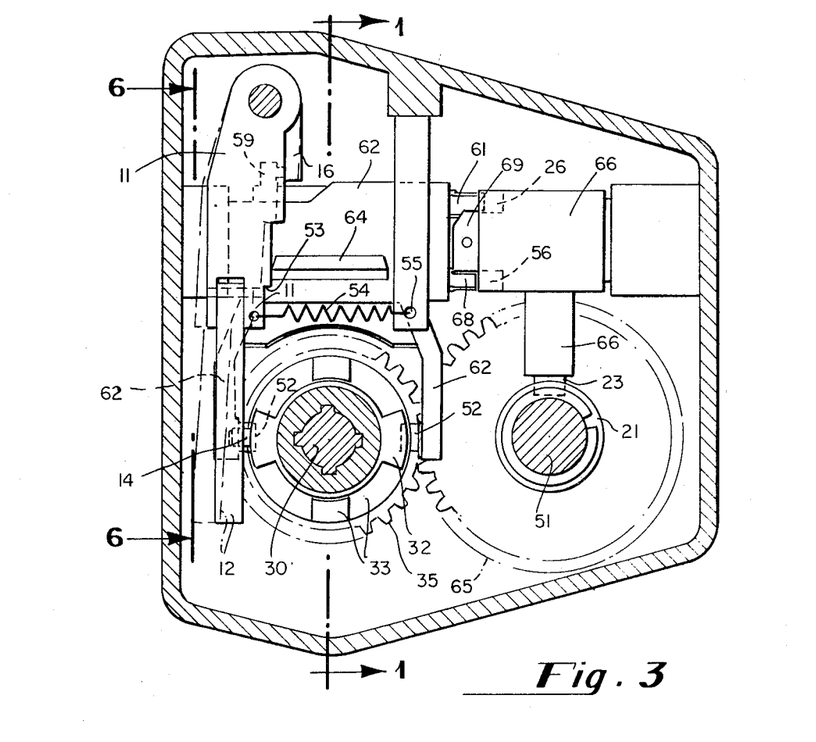
FIG. 3 is an elevational end view looking along the line 3—3 of FIG. 2; also along line 3—3 of FIG. 1.
Figure 4:
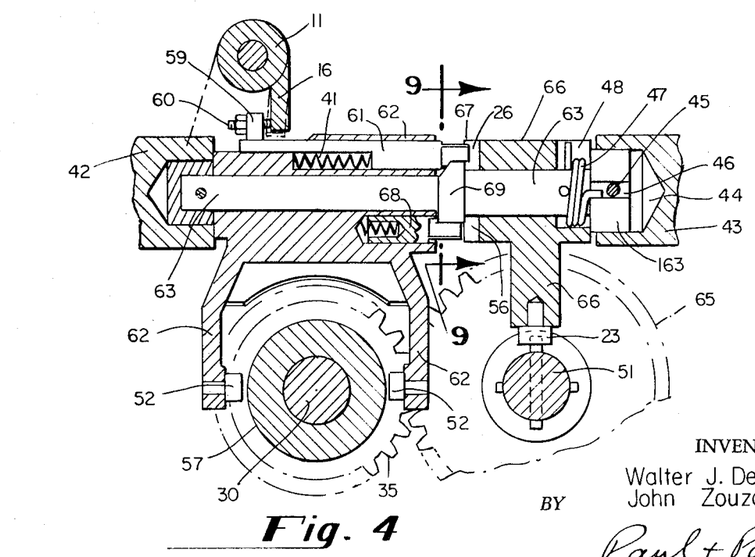
FIG. 4 is an elevational end view looking along the line 4—4 of FIG. 2; also along line 4—4 of FIG. 1.
Figure 5:
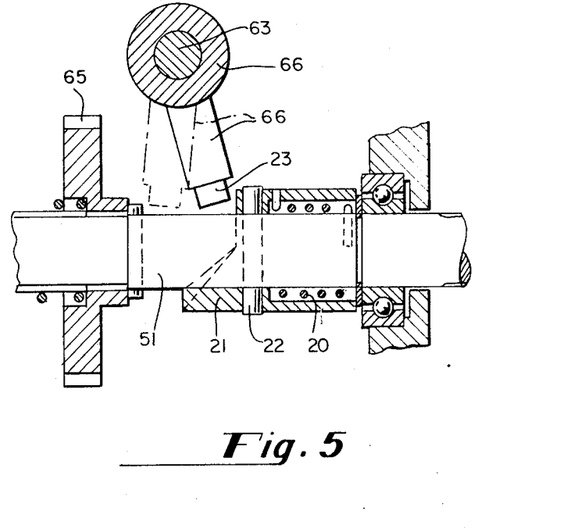
FIG. 5 is an elevational side view looking along the line 5—5 of FIG. 2.

Reference is made to FIGS. 1-7. If, with the power off, the operator manually rotates the handwheel (not shown) the handwheel shaft 51 (FIGS. 2, 5 and 7) will be rotated. Assume the direction of rotation to be that indicated by the arrows in FIGS. 2 and 7. When shaft 51 is first rotated, the nose cam 21, which is pinned to shaft 51 by way of cam slots 24, will also start to rotate but the rotation is only momentary. Rotational movement of nose cam 21 stops as soon as its inclined cam surface 21a engages cam roller 23 of flipper cartridge 66. This engagement is illustrated in FIG. 7(a). As seen best in FIGS. 4 and 5, flipper cartridge 66 is mounted for pivotal movement on fixed shaft 63. When the momentary rotational movement of the nose cam 21 stops, a pin 22 which is fixed on shaft 51, continues to move with shaft 51. This pin 22 then moves, relative to nose cam 21, in a pair of opposed cam slots 24 in nose cam 21. This movement forces nose cam 21 outwardly, to the left as illustrated in FIG. 7(b). When pin 22 on shaft 51 reaches the end of cam slots 24, the pin 22 carries the nose cam 21 with it. Hence, nose cam 21 resumes rotation, and thereafter rotates with shaft 51. This movement of nose cam 21 relative to cam roller 23 of flipper cartridge 66 forces the cam roller 23 to the left as illustrated in FIG. 7(c). As a result, as seen in FIG. 5, flipper cartridge 66 pivots about fixed shaft 63 in a clockwise direction from the solid-line position to the position shown in phantom.

Referring now to FIG. 7(d), when roller 23 of flipper cartridge 66 reaches the peak of the nose cam 21, the opposing thrust of roller 23 is removed, and the pull of tension spring 20 on the nose cam 21 is now able to cause the nose cam 21 to pivot about shaft 51 in the same direction that shaft 51 is being turned. As a result, pin 22 returns to the apex of the cam slots 24 and nose cam 21 is withdrawn from its most forward axial position shown in FIG. 7(c) to the position shown in FIG. 7(d). In FIG. 7(d), the cam follower roller 23, for reasons to be described later, has returned slightly (about one-sixteenth inch) from the position shown in FIG. 7(c) but the peak of the nose cam 21 has returned by a greater distance (one-eighth inch). As a result, the handwheel shaft 51 may thereafter be continued to be rotated without the nose cam 21 striking the roller 23. This eliminates an objectionable clicking sound which would otherwise be heard or felt during manual rotation of the handwheel.

As shown in FIGS. 3 and 4, flipper cartridge 66 is coupled by spring-biased pins 61 and 68 to clutch fork 62 which is pivotal on fixed shaft 63. Thus, when flipper cartridge 66 is pivoted about the fixed shaft 63, clockwise as viewed in FIG. 5, and clockwise as viewed looking in from the left in FIG. 4, clutch fork 62 is also pivoted about the fixed shaft 63 in the same rotational direction as flipper cartridge 66. Rollers 52 of clutch fork 62 are in an annular recess 57 in sliding clutch 33 and, accordingly, the clockwise movement of clutch fork 62 just described causes sliding clutch 33 to slide to the left as viewed in FIGS. 1, 2 and 6. The gear teeth portion 35 of sliding clutch 33 thereupon engages with the teeth of gear 65, which is keyed to the handwheel shaft 51. In this manner, the shift to handwheel drive is accomplished. How the mechanism is latched in handwheel drive will now be described.

When flipper cartridge 66 is moved pivotally clockwise by nose cam 21, as described above, thereby moving fork 62 clockwise, a first latch lever 64, which as seen in FIG. 3 is an integral projection on clutch fork 62, moves downwardly beyond a latching shoulder 53 of a second latch lever 11, as best seen in FIG. 3. Prior to being moved downwardly, as just described, the first latch lever 64 had maintained the second latch lever 11 in an outward position, to the left as seen in FIG. 3, despite the inward pull of spring 54, one end of which is connected to the latch lever 11 and the other end of which to a fixed point 55.

When, however, as described above, as a result of the pivotal movement of flipper cartridge 66 and fork 62, latch lever 64 moves downwardly below the latching shoulder 53, tension spring 54 pulls latch lever 11 inwardly to an extent limited by the width of the lever 64. The limit of the downward movement of latch lever 64 is determined by the pivotal movement of flipper cartridge 66 and fork 62. In a typical case, the latch lever 64 may move to a point about one-sixteenth inch beyond the shoulder 53. Latch lever 64 then returns upwardly, under the action of compression spring 29 on sliding clutch 33, until it engages shoulder 53. This shoulder 53 prevents further upward movement of lever 64, and hence latches fork 62 and sliding clutch 33 in the handwheel drive position, with sliding clutch 33 in engagement with the handwheel drive gear 65.

Figure 6:
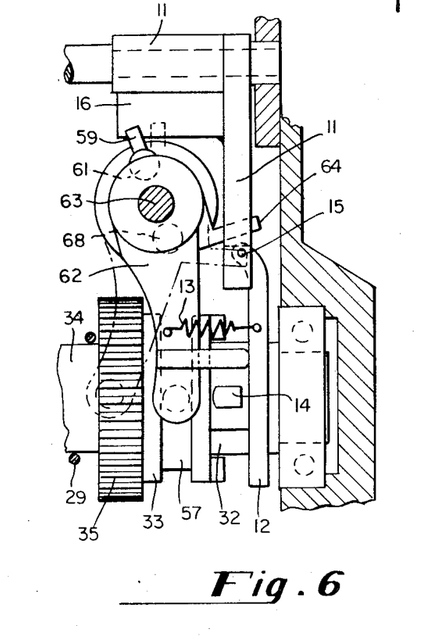
FIG. 6 is an elevational side view looking along the line 6—6 of FIG. 3.

When clutch fork 62 is swung pivotally clockwise to move the sliding clutch 33 into handwheel engagement, a spring 13 attached to fork 62 pulls a tripper lever 12 pivotally forwardly, to the left as viewed in FIG. 6, into the plane of a pin 14 which projects radially outwardly from motor drive clutch member 32. In this movement, tripper lever 12 pivots about a pin 15 on a second latch lever 11.

SHIFT FROM HANDWHEEL DRIVE TO MOTOR DRIVE

Assume that with the clutch mechanism in handwheel engagement, as just described, drive motor 38 (FIG. 1) is energized. When this happens, shaft 30 is driven rotationally by way of helical gears 39 and 40. Clutch member 32, which is secured to shaft 30 by splines 31, also rotates. When clutch member 32 rotates, pin 14, which projects radially from clutch member 32, strikes against the inner surface of tripper lever 12, thereby moving tripper lever 12 outwardly, to the left as viewed in FIG. 3. Tripper lever 12 is connected by pin 15, to second latch lever 11, as seen best in FIG. 6, and, accordingly, when tripper lever 12 moves outwardly, latch lever 11 also moves outwardly against the action of tension spring 54, as seen in FIG. 3. This releases latch lever 64 from shoulder 53 and allows latch lever 64 to move upwardly, as viewed in FIG. 3, or counterclockwise as viewed in FIG. 6. The force for this movement is provided by compression spring 29, seen in FIGS. 1 and 2. Spring 29, when allowed to do so by the release of latch lever 64, moves the sliding clutch 33 to the right, as viewed in FIGS. 1, 2 and 6, thereby moving the spur-gear portion of the sliding clutch 33 out of engagement with the handwheel drive gear 65 and moving sliding clutch 33 into engagement with clutch member 32 which is splined to shaft 30. Thus, by the action just described, the de-clutch mechanism is moved out of handwheel engagement and into motor drive engagement.

THE CLUTCH COUPLING BETWEEN THE FLIPPER CARTRIDGE AND THE CLUTCH FORK

The clutch coupling between flipper cartridge 66 and clutch fork 62 represents a novel and important part of the present invention. The left face of flipper cartridge 66 as viewed in FIGS. 3, 4 and 8 has an annular surface 67 having therein a first recess or slot 26 for receiving a spring-loaded drive pin 61, and having opposite to slot 26 a second wider slot 56 which receives a second spring-loaded pin 68. Second pin 68 is not needed except as part of an anti-clicking arrangement to prevent a clicking noise during handwheel operation which otherwise would occur each time the follower roller 23 struck the nose cam 21. How pin 68 functions will be described later.

Figures 7, 8, 9:
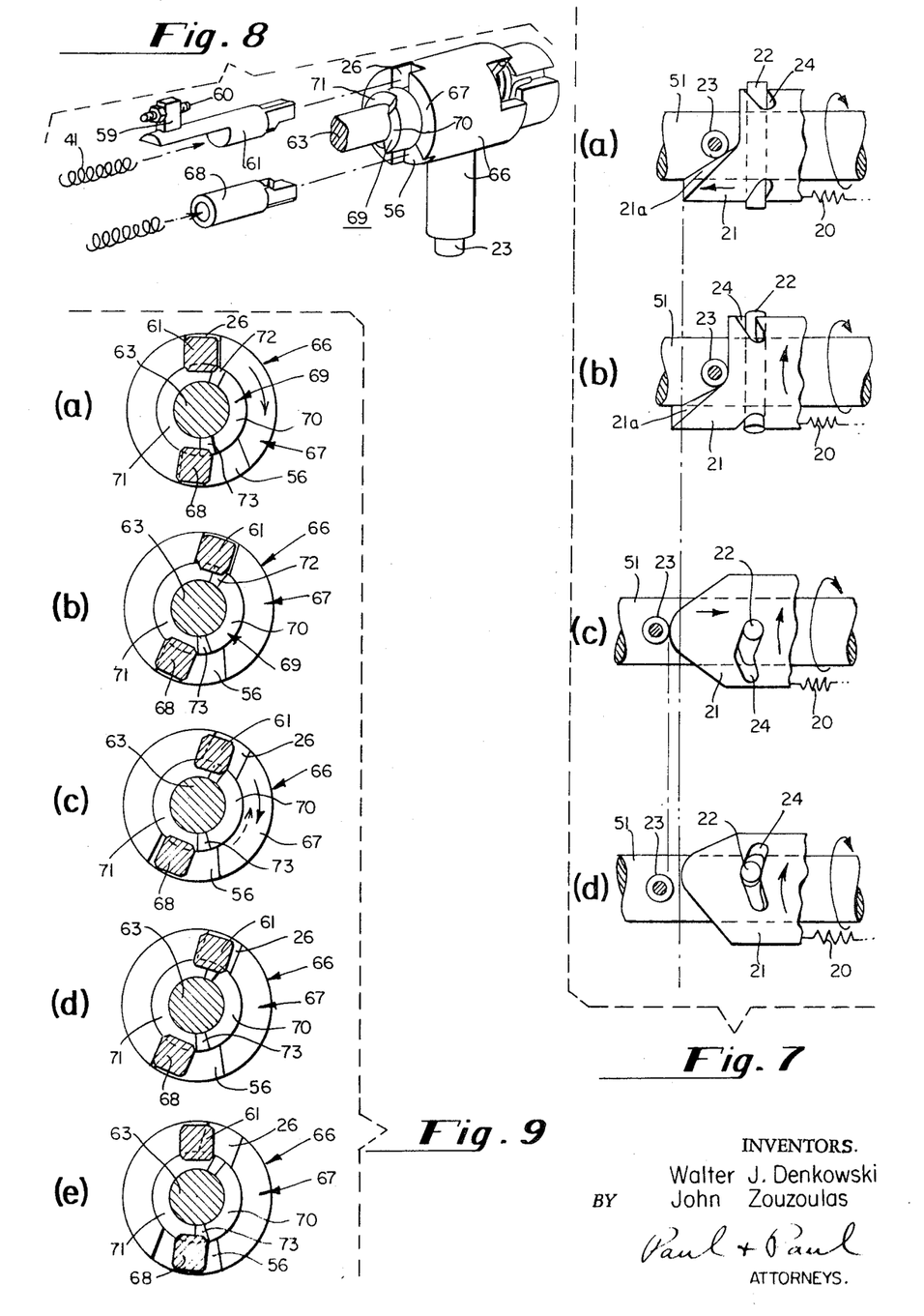
FIG. 7 is a series of sequential views illustrating how the handwheel nose cam operates to move the cam follower roller of the flipper cartridge.
FIG. 8 is a perspective view of the flipper cartridge, the drive pin, and the anti-click pin.
FIG. 9 is a series of sequential views illustrating the action of the flipper cartridge, the drive pin, and the anti-click pin, looking along line 9—9 of FIG. 4.

As seen in FIGS. 8 and 9, concentric with the annular surface 67 of flipper cartridge 66, and of smaller diameter than surface 67, is an annular cam 69. Annular cam 69 has an elevated flat portion 70, and a depressed flat portion 71. Inclined surfaces 72 and 73 connect the elevated flat surface 70 with the depressed flat surface 71. Annular cam 69 is fixed on fixed shaft 63; neither shaft 63 nor annular cam 69 move rotationally. Pins 61 and 68 are supported in slots in clutch fork 62 and are movable rotationally by flipper cartridge 66 relative to fixed shaft 63. When the pins 61 and 68 are so moved, clutch fork 62 is moved pivotally on shaft 63.

Assume that the handwheel shaft 51 has just begun to be rotated by manual operation of the handwheel. The nose cam 21, due to its engagement with cam roller 23, causes the flipper cartridge 66 to move pivotally clockwise toward the phantom position, illustrated in FIG. 5. At this time, drive pin 61 is in slot 26 in the annular face 67 of flipper cartridge 66, as illustrated in FIG. 9(a). Thus, when flipper cartridge 66 is moved clockwise, drive pin 61 is moved rotationally clockwise relative to the fixed shaft 63 and annular cam 69. This is illustrated in FIG. 9(b).

As illustrated in FIGS. 8 and 9, drive pins 61 and 68 have cross sectional areas sufficiently large to engage both the annular surface 67 of the flipper cartridge 66 and also a portion of the annular surface of cam 69. Thus, the annular surfaces 67 and 69 function as outer and inner races, respectively, for the pins 61 and 68. Those portions of the ends of pins 61 and 68 which are in registry with the outer race 67 project substantially beyond the portions which are in registry with the inner race 69. This is to compensate for the fact that inner race 69 projects axially beyond outer race 67.

When, as just described, flipper cartridge 66 is pivoted clockwise, as viewed in FIGS. 5, 8 and 9, and drive pin 61 is carried clockwise relative to the annular inner race 69, pin 61 rides up the inclined slope 72 and as it does so, the pin 61 is withdrawn from slot 26. By the time pin 61 reaches the elevated flat surface 70 of inner race 69, drive pin 61 has been completely withdrawn from slot 26. During this action, compression spring 41, which biases pin 61 toward the flipper cartridge 66, is compressed.

During the clockwise movement of flipper cartridge 66, as just described, and as illustrated in FIGS. 9(a) and 9(b), wherein flipper cartridge 66 pushes pin 61 rotationally clockwise, thereby to pivot fork 62 clockwise, the other pin 68 is carried by the pivoting fork 62 in the same direction and through a distance corresponding to that of the first pin 61. This is illustrated in FIGS 9(a) and 9(b).

When pin 61 becomes completely withdrawn from slot 26, the clockwise rotational movement of pin 61, ceases, since pin 61 is no longer being pushed by the wall of slot 26. At this instant, i.e., at the instant that pin 61 clears the wall of slot 26, fork 62 has reached such a position that its latch lever 64 has reached its limit distance beyond latch shoulder 53. This limit distance may, for example, be one-sixteenth inch. As soon as lever 64 passes shoulder 53 (FIG. 3), lever 11 and its shoulder 53 are pulled in by tension spring 54.

With pin 61 no longer being pushed by flipper cartridge 66, fork 62 is free to return pivotally in a counterclockwise direction, and it does so under the action of spring 29. Its counterclockwise pivotal movement is, however, arrested almost immediately due to the fact that latch lever 64 encounters stop shoulder 53. The return of fork 62 through a short distance, for example, one-sixteenth inch, causes pins 61 and 68 to move counterclockwise for a short distance.

When pin 61 became withdrawn from slot 26, flipper cartridge 66 continued to move rotationally clockwise, driven by the nose cam 21 in extended position pushing against cam follower roller 23, as illustrated in FIG. 5. Thus, the outer race 67 moves clockwise relative to the inner race 69 and also relative to the pins 61 and 68. This over-travel is illustrated in FIG. 9(c Spring-loaded anti-click pin 68 now enters slot 56 which, as shown, is substantially wider than slot 26. After the peak of the nose cam 21 passes the roller 23 (FIG. 7(d)), the flipper cartridge 66 returns counterclockwise a short distance, for example, one-sixteenth inch. This is illustrated in FIGS. 9(d) and 7(d). In FIG. 9(d), pins 61 and 68 are locked in position because fork 62 is latched by latch lever 64 and stop shoulder 53. Thus, flipper cartridge 66 is prevented from returning counterclockwise by the fact that the left wall of slot 56 as viewed in FIG. 9(d) engages the fixed pin 68. As a result, cam follower roller 23 is held beyond the peak of nose cam 21, in its retracted position, and a "clicking" noise is prevented during rotation of the handwheel. Thus, pin 68 functions as an anti-clicking device.

Assume now that when the power comes on, flipper cartridge 66 is unable to return pivotally counterclockwise (FIG. 5) due to the fact that the handwheel has been left in such a position that the peak of nose cam 21 is in a position, such as shown in FIG. 7(d), which blocks the return of roller 23 from the phantom position to the solid-line position. If the inability of flipper cartridge 66 to return counterclockwise prevented fork 62 from returning, then the motor drive would not be capable of shifting the clutch into motor engagement. This condition is taken care of, according to the present invention by providing for the counterclockwise return of fork 62 whether or not flipper cartridge 66 is able to return counterclockwise. This condition may be explained with the aid of FIG. 9(e).

Assume in FIG. 9(e) that the outer race 67 is unable to move counterclockwise because follower roller 23 is blocked by the nose cam 21 of the handwheel shaft 51. When the power comes on, the shaft 30 is driven rotationally. This drives clutch member 32 and pin 14 which projects therefrom strikes tripper lever 12 and drives it outward, to the left as viewed in FIG. 3. This moves lever 11 outward and releases latch lever 64, which moves upward as viewed in FIG. 3 and counterclockwise as viewed in FIGS. 1 and 6. This movement is under the action of spring 29 which urges sliding clutch 33 to the right, as viewed in FIGS. 1, 2 and 6. In this way, fork 62 is moved counterclockwise, and when it does so, pins 61 and 68 are carried counterclockwise. Pin 61 is out of slot 26 of flipper cartridge 66. This pin 61 rides on the outer race 67. Pin 68 is in slot 56 of flipper cartridge but this slot 56 is wide enough to allow pin 68 to move counterclockwise through a sufficient angle to alow sliding clutch 33 to be returned into engagement with clutchelement 32. In this way, assurance is provided that the sliding clutch 33 will be shifted into motor drive engagement even though flipper cartridge 66 is blocked from counterclockwise return movement by nose cam 21 blocking roller 23.

Provision is also made for assuring that, for motor drive operation, drive pin 61 is out of slot 26. This assurance is provided by the following: Pin 61 is elongated, as seen in FIGS. 4 and 8, and a strike member 59 with an adjustable screw 60 is mounted on and projects above the upper surface of the elongated portion. Lever 11 is provided with a depending portion 16. When the power comes on and lever 11 is pushed outwardly along with tripper 12, as viewed in FIG. 3 and as described hereinabove, portion 16 strikes the adjustment screw 60 of strike member 59 and moves pin 61 to the left, as viewed in FIGS. 3, 4 and 8. This guarantees that drive pin 61 is not in slot 26 when fork 62 is to pivot counterclockwise to return sliding clutch 33 toward motor clutch member 32 and assures such return irrespective of the inability of the flipper cartridge 66 to also return. For, as previously explained, if nose cam 21 happens to have been left in the position shown in FIG. 7(c), the follower roller 23 will be blocked from returning and flipper cartridge 66 will be unable to return to the solid line position shown in FIG. 5. However, this has no effect on the operation of the valve operator mechanism in motor drive.

Assume that the nose cam 21 has been previously left in the position shown in FIG. 7(c), and has remained in that position all during motor drive. When the motor drive stops, and the operator, wishing to open or close the valve manually, rotates the handwheel, the handwheel shaft 51 (FIG. 7) rotates and as soon as the nose cam 21 has been moved away from the cam follower roller 23 the flipper cartridge 66 swings pivotally from the phantom position (approx.) shown in FIG. 5 to the solid line position there shown.

The biasing means for returning flipper cartridge 66 from the phantom to the solid line position (FIG. 5) will now be described. As seen best in FIG. 4, flipper cartridge 66 is mounted on fixed shaft 63 for pivotal movement thereon. Shaft 63 is supported between fixed housing members 42 and 43 (FIG. 4). At the right end, shaft 63 has an enlarged-diameter portion 163 which is fitted within a recess 44 in housing member 43 and is pinned to the housing member 43 by a pin 45. A retaining slot 46 in the enlarged shaft portion 163 retains one end of a helical spring 47 which is coiled about the small-diameter portion of fixed shaft 63 within a recess 46 in flipper cartridge 66. The other end of spring 47 bears against a wall of recess 48 and urges flipper cartridge 66 to pivot on shaft 63 in a direction to swing the depending portion of cartridge 66 and roller 23 from the phantom to the solid line position shown in FIG. 5. Thus, spring 47 keeps cam follower roller 23 against the nose cam 21, except when prevented from so doing by the anti-click pin 68 as previously described and as illustrated in FIG. 7(d).

SUMMARY OF THE OPERATION

With the power off, if the manual operator rotates the handwheel (not shown) the manual drive shaft 51 will be rotated and nose cam 21 will be first extended forwardly toward cam follower roller 23 (FIG. 7(b)) and will then rotate with shaft 51 (FIG 7(c)) to move the roller 23 and flipper cartridge 66 pivotally from the solid line position (FIG. 5) to the phantom position. When flipper cartridge 66 is so moved, pivotally on shaft 63 (FIG. 8), pin 61 in recess 26 is moved in a like direction, and this causes a similar pivotal movement of fork 62 on shaft 63 in a direction corresponding to that of flipper cartridge 66. This pivotal movement of fork 62 on shaft 63 causes sliding clutch member 33 to shift out of motor drive and into manual drive, as shown in phantom in FIG. 2, with spur gear portion 35 of clutch 33 meshing with spur gear 65 on the manual drive shaft 51. Meshing of the spur gears 35 and 65 is facilitated by the fact that gear 65 is spring-loaded on shaft 51 by spring 50.

When fork 62 swung pivotally on shaft 63 to shift sliding clutch 33 into manual drive, lever 64 of fork 62 became latched under latching shoulder 53 of lever 11. This latching prevents return of sliding clutch 33, despite the thrust of spring 29 on spur gear 35.

When fork 62 is moved pivotally in a direction to shift sliding clutch 33 out of motor drive engagement, tripper 12 is pulled by tension spring 13 into the plane of projecting button 14 (FIGS. 2 and 6) on motor-drive clutch element 32. Tripper 12 is biased inwardly toward the surface of element 32 by spring 54 (FIG. 3).

When power to the motor drive is turned on, shaft 30 and clutch element 32 are driven rotationally. Projecting pin or button 14 strikes tripper 12 and pushes it outwardly. This moves lever 11 outwardly and unlatches lever 64, and, under the thrust of spring 29 the clutch elements 35 and 33 are shifted out of manual drive and into motor driven engagement with clutch element 32. The engagement between clutch elements 33 and 32 is a lug-on-lug type of engagement.

When the clutch elements 35 and 33 are shifted, as just described, fork 62 pivots on shaft 63. Pivotal movement of fork 62 occurs even though flipper cartridge 66 may not be able to move pivotally in a corresponding manner due to roller 23 being blocked by nose cam 21 (FIG. 7(c)). Such pivotal movement of fork 62 occurs because fork 62 is not coupled to flipper 66 at this time. For, during the previous shift out of motor drive into manual drive, when flipper cartridge 66 was driving fork 62 through pin 61, pin 61 was gradually cammed out of slot 26 by cam 69, and at the completion of the stroke, pin 61 was completely out of the slot. Withdrawal of pin 61 from slot 26 is further effected during the shift to motor drive by the action of strike portion 16 of lever 11 against the adjustable screw 60 on pin 61.

The mechanism just described above guarantees the return of sliding clutch 33 into motor drive engagement even though the manual operator, by unfortunate chance, may have left the manual drive shaft 51 in such position that the return of cam follower roller 23 is blocked by nose cam 21.

While the provision of a secondary clutch mechanism between flipper cartridge 66 and fork 62 has the important advantage of assuring return of sliding clutch 33 to motor drive engagement, it introduces a minor but objectionable problem in that the flipper cartridge 66 is not latched into the phantom position shiwn in FIG. 5 when fork 62 is latched by lever 64. As a consequence, unless something is done about it, the cam follower roller 23 will be maintained against nose cam 23 during the entire handwheel drive and a "clicking" sound will be heard during rotation of the handwheel drive shaft, one "click" being produced each time the roller 23 passes over the crest of the cam and drops down against the cam surface. While not harmful, such "clicking" sound may be deemed objectionable, and accordingly means have been provided to avoid it.

The anti-clicking means provided by the present invention includes the provision of a second pin 68 which is carried by fork 62 and which drops down into a recess 56 in the annular face of flipper cartridge 66 at the end of the pivotal movement of fork 62 which shifts the sliding clutch 33 into handwheel engagement. During the time that flipper cartridge 66 is driving pin 61 and fork 62, the anti-click pin 68 is at the edge of recess 56. When pin 61 becomes withdrawn from slot 26, pin 61 is no longer driven but flipper cartridge 66 continues to be pivoted for a short distance by cam 21 and roller 23 and anti-click pin 68 drops into recess 56. Roller 23 then passes over the peak of cam 21 and flipper cartridge 55 returns slightly until the wall of recess 56 strikes against pin 68. At this time, pin 68 is fixed in position since fork 62, which carries pin 68, is latched by lever 64 and shoulder 53. Thus, pin 68 holds flipper cartridge 66 in approximately the position shown in phantom in FIG. 5.

To assume that the peak of the nose cam 21 does not strike the roller 23 during each rotation of the manual drift shaft 51 after the mechanism has been shifted to handwheel drive, the nose cam 21 is first extended, as shown in FIGS. 7(b) and 7(c) and then retracted as shown in FIG. 7(d). The extent of retraction of nose cam 21 is made greater than the distance through which the roller 23 returns after the peak of the cam 21 has passed the roller 23 and the flipper cartridge 66 is permitted to return before it is stopped by pin 68 in recess 56.

What is claimed is:

1. A valve operator having:
   a. a main drive shaft 36;
   b. motor drive means 38;
   c. coupling means 39, 40, 30, 32, 33, 34, 28 including a sliding clutch member 33 for coupling said motor drive means to said main drive shaft according to the position of said sliding clutch member;
   d. manual drive means including a manual drive shaft 51;
   e. coupling means 65, 35, 33 including said sliding clutch member 33 for coupling said manual drive means to said main drive shaft according to the position of said sliding clutch member;
   f. spring means 29 normally biasing said sliding clutch member in motor drive engagement;
   g. a clutch fork 62 pivotally mounted on a fixed support shaft 63 and engaging said sliding clutch member for shifting said sliding clutch member between motor drive and manual drive engagements;
   h. a flipper cartridge 66 pivotally mounted on said fixed support shaft;
   i. cam means 21 on said manual drive shaft for moving said flipper cartridge pivotally on said fixed support shaft;
   j. secondary clutch means 61, 26, 69 coupling together said flipper cartridge and clutch fork for causing the pivotal movement of said flipper cartridge to move said clutch fork pivotally on said fixed support shaft in a direction to shift said sliding clutch member out of motor drive and into manual drive engagement;
   k. said secondary clutch means including cam means 69 adapted to effect automatic decoupling of said flipper cartridge and clutch fork after said flipper cartridge has moved pivotally through an angle sufficient to shift said sliding clutch member out of motor drive and into manual drive engagement;
   l. latch means 64, 11, 53, 54 for holding said clutch fork in manual drive engagement after said aforesaid shifting has taken place;
   m. tripper means 12, 11 actuated by said motor drive means 32, 14 for unlatching said latch means to allow said spring biasing means 29 to shift said clutch fork and sliding clutch out of manual drive and into motor drive engagement even though said cam means 21 on said manual drive shaft is in such position as to block return to said flipper cartridge.

2. Apparatus according to claim 1 characterized in that said secondary clutch means includes:
   a. an annular outer race 67 on said flipper cartridge concentric with said fixed support shaft 63;
   b. a recess 26 in said annular outer race;
   c. a spring-loaded pin 61, 41 carried by said clutch fork and adapted to enter into said outer race recess;
   d. annular cam means 69 on said fixed support shaft 63 forming an inner race 69 concentric with said outer race 67 of said flipper cartridge;
   e. said inner race being engaged by said pin, whereby said pin is cammed out of said recess 26 upon sufficient angular movement of said flipper cartridge about said fixed support shaft, thereby to decouple said clutch fork from said flipper cartridge.

3. Apparatus according to claim 2 characterized in that:
   a. projecting means 59, 60 are provided on said pin 61 positioned to be struck by said tripper means 11 when said motor drive means are energized, thereby to assure that said spring-loaded pin 61 is out of said recess 26 in said outer race of said flipper cartridge.

4. Apparatus according to claim 2 characterized in that said cam means 21 for pivoting said flipper cartridge 66 includes means 22, 24 for extending the cam toward said flipper cartridge during an initial flipper-cartridge-engaging movement and then retracting the cam means 21 to avoid contact with said flipper cartridge during further rotation of said manual drive shaft.

5. Apparatus according to claim 2 characterized in that:
   a. said annular outer race 67 on said flipper cartridge is provided with a second recess 56;
   b. a second spring-loaded anti-blick pin 68 is carried by said clutch fork and adapted to enter into said second recess 56 when said clutch fork is latched in manual drive engagement for preventing return of said flipper cartridge toward said manual-drive-shaft cam means 21 during manual drive engagement.

6. Apparatus according to claim 5 further characterized in that:
   a. the angular width of said second recess 56 is sufficiently greater than the angular width of said second pin 68 to permit sufficient angular movement of said second pin in said second recess in a direction to permit sufficient angular movement of said clutch fork relative to said flipper cartridge to allow said clutch fork to shift said sliding clutch member out of manual drive and into motor drive engagement even though said flipper cartridge is blocked by said cam means 21.

7. Apparatus according to claim 2 characterized in that:
   a. said annular cam means 69 on said fixed support shaft 63 is located axially closer to said spring-loaded pin 61 than is said annular outer race 67 on said flipper cartridge;
   b. said pin 61 has a first portion which projects axially beyond a second portion in a direction toward said annular outer race on said flipper cartridge;
   c. said projecting first portion being in registry with said outer race, said second portion being in registry with said inner race.

8. Apparatus according to claim 2 characterized in that:
   a. said flipper cartridge has a portion which extends outwardly relative to said fixed support shaft;
   b. a cam follower roller 23 is mounted at the outer end of said outwardly extending portion.

9. Apparatus according to claim 8 further characterized in that:
   a. spring biasing means 47 are provided for urging said flipper cartridge in a direction tending to maintain said cam follower roller 23 in contact with said cam means 21 on said manual drive shaft.

10. Apparatus according to claim 4 characterized in that said means for extending said cam means 21 toward said flipper cartridge includes:
   a. a cam slot 24 in said cam means 21;
   b. a pin 22 in said cam slot and fixed to said manual drive shaft 51.

* * * * *